United States Patent [19]

Pinson

[11] Patent Number: 4,553,718

[45] Date of Patent: Nov. 19, 1985

[54] NAVAL HARRASSMENT MISSILE

[75] Inventor: George T. Pinson, Huntsville, Ala.

[73] Assignee: The Boeing Company, Seattle, Wash.

[21] Appl. No.: 430,346

[22] Filed: Sep. 30, 1982

[51] Int. Cl.[4] .............................................. F41G 7/22
[52] U.S. Cl. .................................... 244/3.15; 89/1.11; 244/3.1
[58] Field of Search ................. 89/1 A; 244/3.1, 3.15, 244/3.19

[56] References Cited

U.S. PATENT DOCUMENTS

| | | | |
|---|---|---|---|
| 2,987,269 | 6/1961 | Weller | 244/3.13 |
| 4,160,415 | 7/1979 | Cole | 102/214 |
| 4,267,562 | 5/1981 | Raimondi | 89/1 A |
| 4,296,894 | 10/1981 | Schnäbele et al. | 244/3.27 |
| 4,471,923 | 9/1984 | Hoppner et al. | 244/3.1 |

FOREIGN PATENT DOCUMENTS 0048068  3/1982  European Pat. Off. ............. 89/1 A Primary Examiner—Charles T. Jordan
Attorney, Agent, or Firm—Edwin H. Crabtree

[57] ABSTRACT

A naval harrassment missile for autonomously flying to a designated target area such as an enemy naval warship. The missile designed for searching, finding and harrassing the target. The missile may send a homing signal to guide other missiles to the target or by a homing signal attack the target using either a high explosive or a self-forging fragmentation warhead.

11 Claims, 10 Drawing Figures

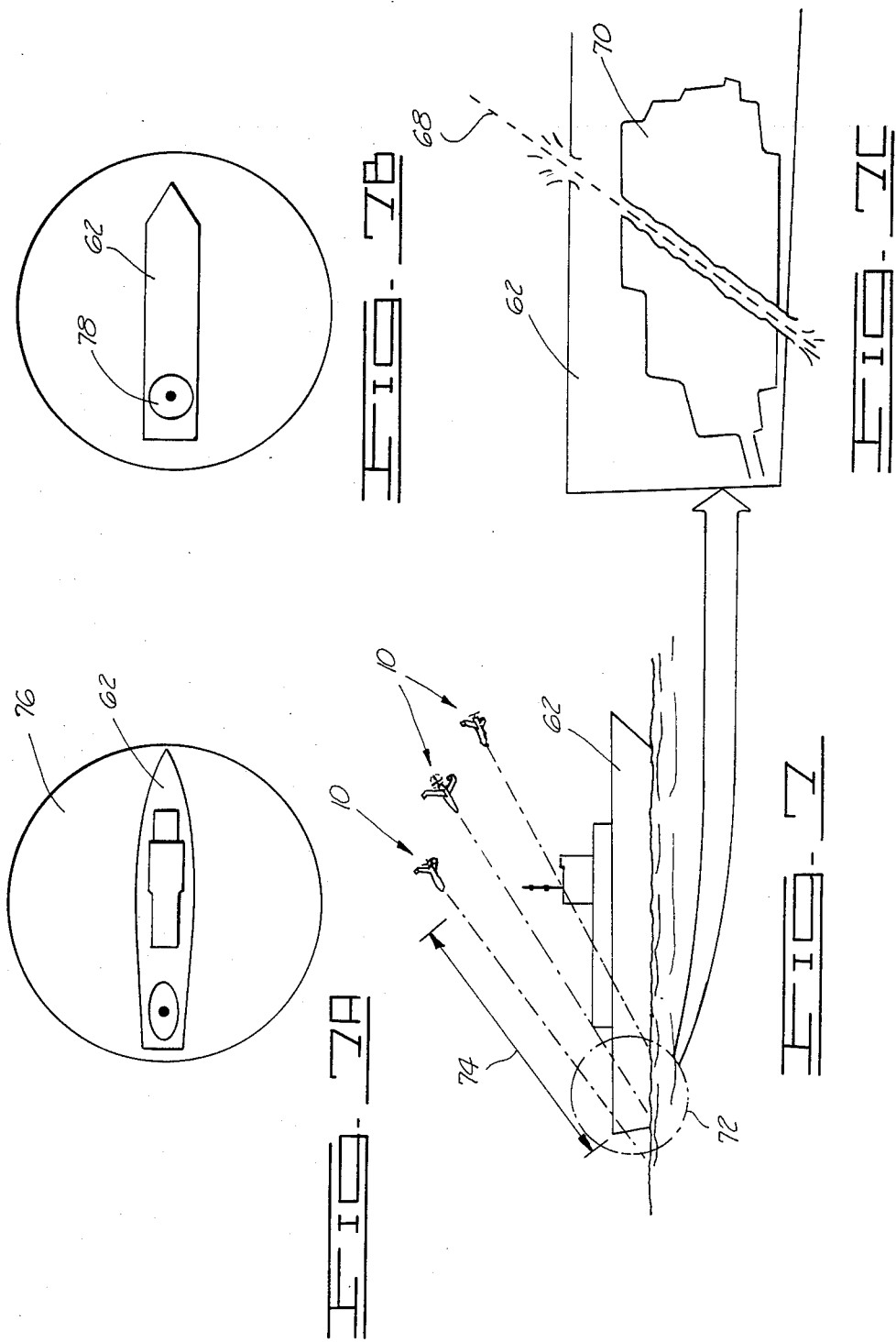

NAVAL HARRASSMENT MISSILE

BACKGROUND OF THE INVENTION

This invention relates to an autonomous fly and forget missile and more particularly but not by way of limitation to a naval harrassment missile designed for launching aboard a ship and designed to search a wide area for targets and upon detecting a suitable target provide data to other missiles for guiding the missiles to the target.

A number of attempts have been made to permit the acquisition, harassment, observation and attack of naval vessels while at sea. Direct attack by aircraft has been successful, however, air defense techniques such as ground-to-air missiles and, in the future, lasers, together with air-to-air defense methods make direct attack costly. Long range artillery has the disadvantage in that effectiveness depends on an observer to direct effective fire. High speed naval attack missiles have been effective, however, their range is limited and requires that the target be acquired prior to launch. Torpedoes have classically been effective, however, range is limited.

Heretofore, there have been various types of drone type missiles, aircraft guidance systems and the like described in U.S. Pat. No. 4,296,894 to Schnabele et al, U.S. Pat. No. 3,415,465 to Bedford, U.S. Pat. No. 3,715,953 to Allan, U.S. Pat. No. 2,807,194 to Cammin-Christy, U.S. Pat. No. 3,124,072 to Herrmann, U.S. Pat. No. 3,138,352 to Saholt, U.S. Pat. No 3,721,410 to Anspacher, U.S. Pat. No. 3,759,466 to Evers-Euterneck, U.S. Pat. No. 3,962,537 to Kearns et al, U.S. Pat. No. 4,004,487 to Eichweber, U.S. Pat. No. 4,256,012 to Cowart et al.

None of the above mentioned patents specifically provide means for sensor data to be processed on board the missile enabling complete autonomous operation with the missile coordinating between other missiles for multiple intercept of a target.

SUMMARY OF THE INVENTION

The naval harrassment missile is part of a total weapon system and is designed to autonomously fly to a designated target area, search for targets using an on board target sensor and acquire and harrass the targets.

Further, the harrassment missile sends out homing signals to guide other missiles to the target or the missile itself maybe guided to the target by a homing signal. Also, the harrassment missile may use either a high explosive or a self-forging fragmentation warhead.

The missile may be launched as a single or multiple unit. Further, after launch, the missile is an autonomous fly and forget missile which operates totally under control of an on board microprocessor or flight computer which is programmed prior to the launch of the missile.

The flight computer in board the missile contains software that controls all launch, flight, navigation and terminal attack flight regimes.

The missile aligns itself with the target and uses a self-forging fragmentation warhead to attack the vital portions of the target. The warhead need not impact the target and may be activated at distances up to 500 feet from the target. Also the missile may use a standard high explosive warhead to damage the target by direct impact and explosion.

The naval harrassment missile includes a missile having deployed wings with a propeller, engine, fuel system, transmitting and receiving antenna, necessary gyros, missile flight computer, transceiver, navigational unit, target sensor and warhead. Further, the missile is designed to be shipped and stored in a storage module to allow the handling, storage and launch on shipboard.

The harrassment missile further includes an interface to provide for tests prior to launch. The interface connects the missile to a launch controller. The launch controller can be a separate test and control unit. The missile flies a preprogrammed flight path to a designated target area. Upon arrival at the target area the target sensor is activated which searches for, detects, acquires and provides guidance data to the missile for use in harrassment by loitering in the target vicinity or during terminal attack to destroy the target. A wide range of sensors can be used on the missile to send coded navigational signals to other missiles informing them of the target type and location. This data is also received by the launch site for action.

The advantages and objects of the invention will become evident from the following detailed description of the drawings when read in connection with the accompanying drawings which illustrate preferred embodiments of the invention.

BRIEF DESCRIPTION OF THE DRAWINGS

FIGS. 7, 7A, 7B and 7C illustrate a typical attack mode of the naval harrassment missile.

DETAILED DESCRIPTION OF THE DRAWINGS

Figure 1:
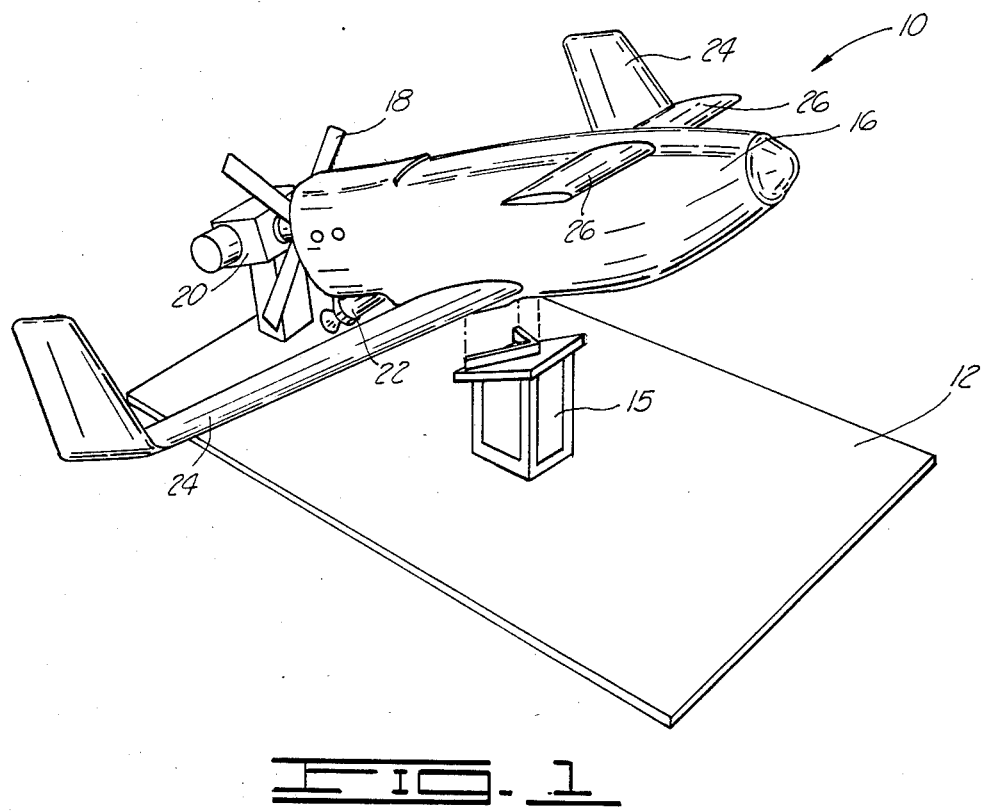
FIG. 1 illustrates the naval harrassment missile in a perspective view.
Figures 2, 3:
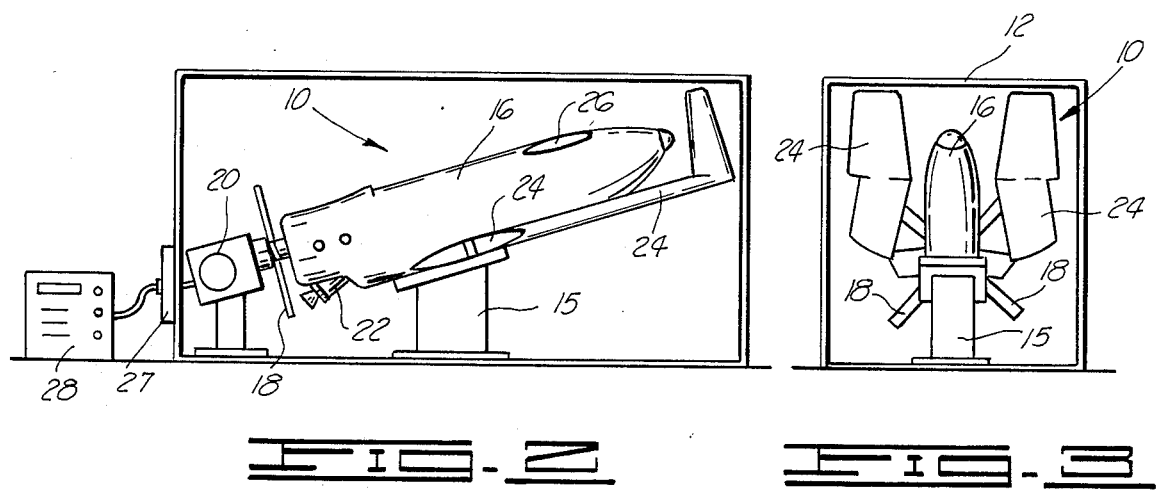
FIG. 2 shows a side view of the missile in its storage module.
FIG. 3 shows a front view of the missile in its storage module.
Figure 4:
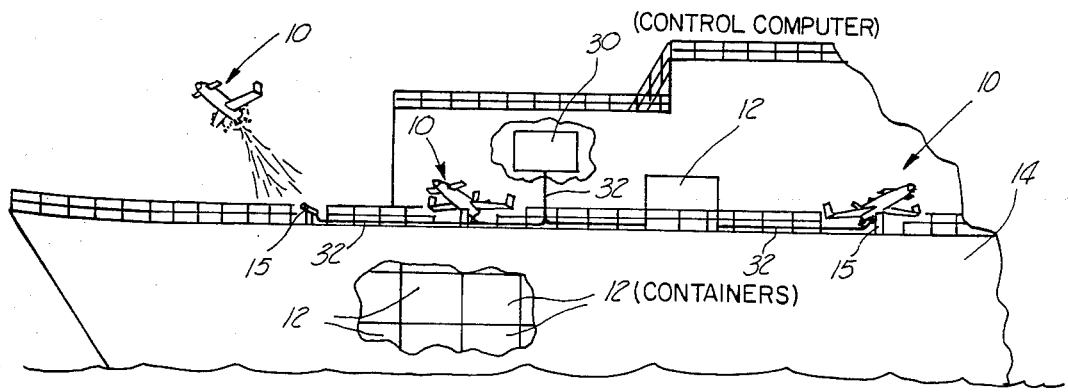
FIG. 4 illustrates launch of the missile on shipboard.

In FIGS. 1, 2 and 3 the basic packaging and launching concept of the naval harrassment missile is shown. The missile is designated by general reference numeral 10 and is shown in a shipping and storage module 12. The missile 10 is designed to permit the handling, storage and launch of the missile 10 from a ship 14 shown in FIG. 4 or it may be included in submarine storage which is not shown in the drawings. Where it is required to launch large numbers of the missiles 10, multiple launch containers 12 may be used as shown in FIG. 4.

FIG. 1 illustrates the missile 10 on a launch stand 15 with a missile frame 16 and propeller 18 connected to an automatic starter 20. The missile 10 also includes an automatic rocket assist take-off unit 22. The missile frame 16 is shown with connected deployed wings 24 and canards 26.

In FIG. 2 an interface 27 for launch and test connects the missile 10 to a launch controller 28. The launch controller 28 can be a separate test and control unit or this function can be provided by a shipboard computer 30 as illustrated in FIG. 4.

This computer 30 can control a large number of the missiles 10 by the use of a standard data bus 32 such as an IEEE 488.

The shipboard or control computer 30 provides mission data planning functions for all of the missiles 10 to be launched or the launch controller 28 can program the missile flight computer. Upon command from the control computer 30 the missile flight computer initiates the assist take-off unit 22 which precipitates the launch of the missile 10.

In FIG. 1 the missile wings 24 are deployed manually and the missile 10 is fueled manually however, automatic means for wing deployment and fueling may be provided. In this concept also the shipping and storage module 12 is manually removed.

The missile 10 has the capability of carrying a number of different payloads and is capable of extended flights of five hours or more at speeds in access of 100 knots. The missile 10 is depicted in detail in FIG. 5 and controlled by a missile flight computer 34.

Figure 5:
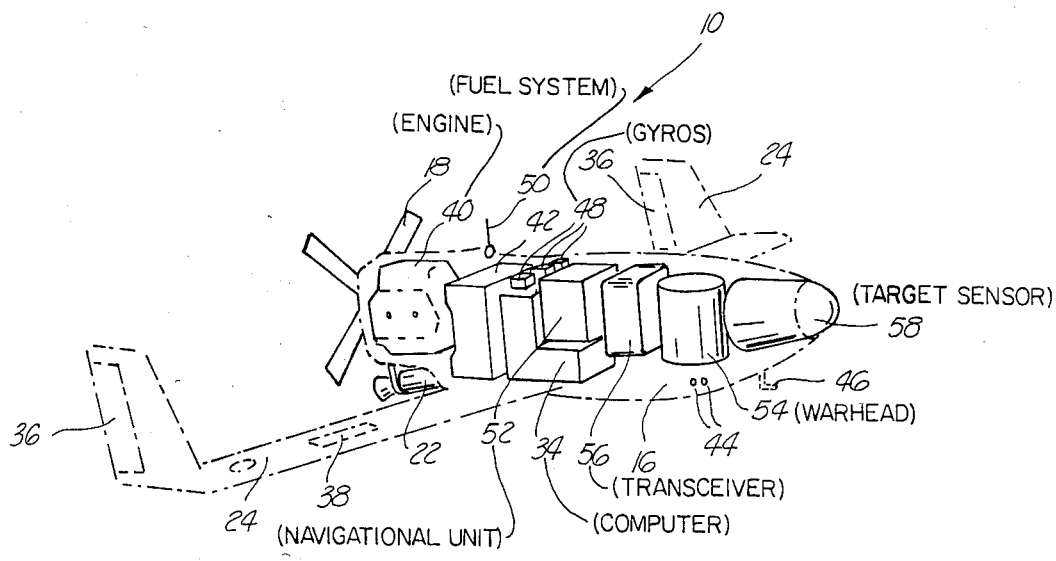
FIG. 5 illustrates the missiles subsystems.

The missile flight control is provided by the canards 26 and rudders 36 although spoilers 38 located in the wings could replace the rudders 36 which are used during terminal flight to provide yaw turn control. Propulsion is provided during launch by the rocket assist take-off unit 22. After assist take-off burnout, power transition is made to an engine 40. In FIG. 5 the engine 40 selected is a reciprocating engine however a jet engine could be used equally well. Fuel is provided by a fuel system 42. Engine speed is controlled by the missile flight computer 34. Air speed and altitude are determined by static pressure measurements using static pressure ports 44 and a pitot tube 46 measures dynamic pressure. Stabilization data is provided by gyros 48 or sensors. The missile 10 also includes a transmitting and receiving antenna 50, a navigational unit 52, a warhead 54, a transceiver 56 and target sensor 58.

The missile 10 flies a preprogrammed flight path to a designated target area. Navigation data is provided by the navigational unit 52. Upon arrival at a target area the target sensor 58 is activated which searches for, detects, acquires and provides guidance data to the missile 10 for use in harrassment by loitering in the target area or during terminal attack to destroy the target. A wide range of sensors can be used. Upon target acquisition the missile 10 sends a coded navigational signal to other missiles 10 informing them of the target type and location. Further, this data is also received by the launch site for action.

The following types of sensors can be used in the missile. All of these sensors are interfaced with the missile flight computer 34 using a standard data bus. They are a radio frequency radar homer, radio frequency radar jammer, infrared sensor, MMW sensor and an imaging sensor. This list of sensors is not exhaustive but only includes typical types of sensors which can be used on the missile 10.

Figure 6:
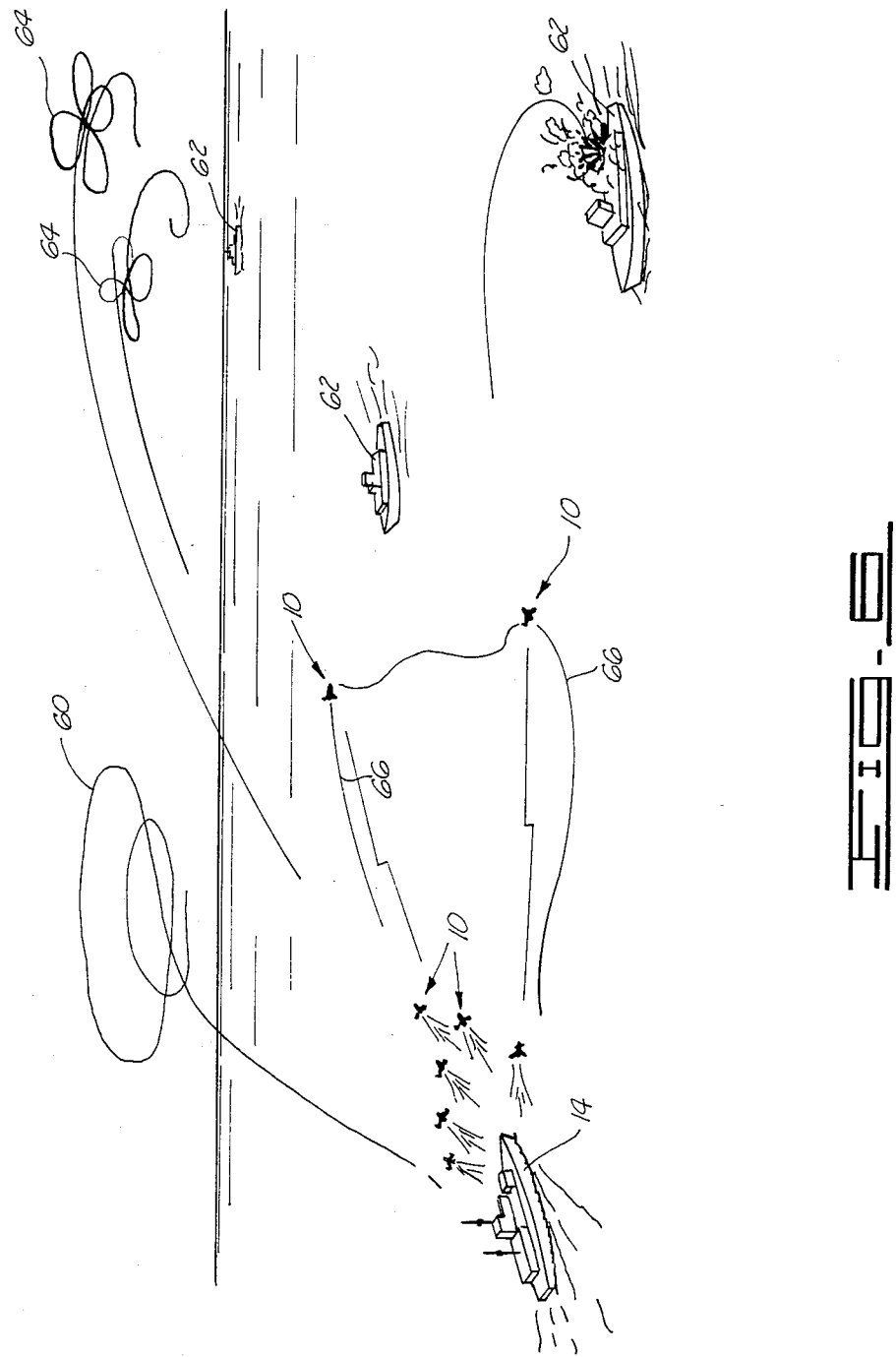
FIG. 6 illustrates a mission scenario.

Mission elements are shown in FIG. 6. Scout and search missiles 10 are sent out from the naval ship 14. Upon arrival at a target area the missiles 10 go into an autonomous search pattern 60. An expanding spiral search mode is used to permit the missile 10 to search as large an area as possible. The sensors search for an acceptable target 62. As soon as the target 62 is acquired by the sensors 58, the missiles 10 enter a harrassment loiter pattern 64 or observation mode and either attack the target 62 or transmit position coordinates or homing signal 66. The signal 66 attracts other uncommitted missiles 10 to the targets 62 and can be used to guide other or additional missiles 10 to the target 62. This action can be used to precipitate a massive attack on the targets 62.

The target kill is accomplished by either direct impact using a high explosive warhead or at standoff distances using a self-forging fragmentation warhead. The self-forging fragmentation warhead is particularly attractive to anti-ship applications since it will dause deep penetration as shown by dotted line 68, penetrating through the warship 62 and through it propulsion system 70 as shown in FIG. 7. The ability to cause damage is dependent largely on the ability of the sensor to detect vital areas of the ship 62 and guide the missile's attack to the vulnerable area as shown and surrounded by dotted circle 72.

The self-forging fragmentation warhead can typically penetrate over three inches of cold rolled steel at a standoff range of up to 500 feet as indicated by line 74. Armor plate on the top surfaces of a ship 62 are usually thin, for example, one inch or less. In addition, if the warhead is set off at lesser distances, it has greater penetrating power.

In the naval harrassment missile 10, the preferred sensor 58 has imaging capabilities such as a TV or CCD imaging array 76 shown in FIG. 7A. The target 62 is observed by the sensor 58, the data processor classifies the target 62 and using preprogrammed data, preferred areas 78 of the target 62 are identified and the target 62 is attacked as shown in FIG. 7B. At suitable ranges, the self-forging fragmentation warhead is fired and the warhead fragments penetrate the target 62 to the vital area 70 as shown in FIG. 7C.

Changes may be made in the construction and arrangement of the parts or elements of the embodiments as described herein without departing from the spirit or scope of the invention defined in the following claims.

I claim:

1. A naval harrassment missile for launching frpom shipboard and autonomously flying to a designated target area and attacking a target and providing a homing signal for other missiles to guide them in attacking the target, the missile comprising:

a missile airframe with deployed wings, the wings when deployed fixed to the missile for controlling the missile during target harrassment, observation and terminal attack flight;

drive means mounted on the airframe for propelling the missile to the target area;

a missile flight computer mounted on the airframe and adapted for interfacing with a control computer on shipboard and receiving mission data therefrom, the flight computer receiving a command from the control computer to initiate take-off, the flight computer having preprogrammed information for flight to a designated target area, the flight computer controlling the speed of the drive means;

a target sensor mounted on the airframe and activated when the missile arrives in the designated area, the sensor when activated searches for and detects a target, the sensor providing guidance data on the target to the flight computer and control computer, the flight computer and control computer with the target data having the option to instruct the missile to enter a harrassment loiter pattern, an observation pattern and attack the target; and a navigational signal unit mounted on the airframe for providing information to the flight computer and control computer for providing target data to other missiles to guide the other missiles in attacking the target.

2. The missile as described in claim 1 further including a shipping and storage module for receiving the missile therein, the module including a launch stand for receiving the missile thereon, an automatic starter connected to the drive means for starting the drive means; and an interface connected to the automatic starter for connecting the missile to a launch controller for performing separate tests by a shipboard computer.

3. The missile as described in claim 1 further including static pressure ports and pitot tube mounted on the airframe for determining static pressure measurements and dynamic pressure.

4. The missile as described in claim 1 further including gyros mounted on the airframe for providing stabilization data to the missile flight computer.

5. The missile as described in claim 1 further including a warhead mounted on the airframe for attacking the target.

6. The missile as described in claim 5 wherein the warhead is a self-forging fragmentation warhead for penetrating the armor plate of an enemy war ship.

7. A naval harrassment missile for launching from shipboard and autonomously flying to a designated target area and attacking a target and providing a homing signal for other missiles to guide them in attacking the target, the missile comprising:
  a missile airframe with deployed wings, the wings when deployed controlling the missile during target harrassment, observation and terminal attack flight;
  an engine drive with propeller for propelling the missile to the target;
  a missile flight computer mounted on the airframe and adapted for interfacing with a control computer on shipboard and receiving mission data therefrom, the flight computer receiving a command from the control computer to initiate takeoff, the flight computer having preprogrammed information for flight to a designated target area, the flight computer controlling the speed of the engine drive;
  a transmitting and receiving antenna connected to a transceiver for receiving data from the control computer on shipboard or from other missiles; and
  a target sensor mounted on the airframe and activated when the missile arrives in the designated target area, the sensor when activated searches for and detects a target, the sensor providing target data to the flight computer and control computer, the flight computer and control computer having the option to instruct the missile to enter a harrassment loiter pattern, an observation pattern and attack the target.

8. The missile as described in claim 7 further including static pressure ports and pitot tube mounted on the airframe for determining static pressure measurements and dynamic pressure.

9. The missile as described in claim 7 further including gyros mounted on the airframe for providing stabilization data to the missile flight computer.

10. The missile as described in claim 7 further including a warhead mounted on the airframe for attacking the target.

11. The missile as described in claim 10 wherein the warhead is a self-forging fragmentation warhead for penetrating the armor plate of an enemy war ship.

* * * * *